United States Patent
Chmela et al.

(10) Patent No.: US 6,213,086 B1
(45) Date of Patent: Apr. 10, 2001

(54) COMBUSTION ENGINE

(75) Inventors: Franz Chmela; Peter Meurer, both of Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/335,187

(22) Filed: Jun. 17, 1999

(30) Foreign Application Priority Data

Jun. 18, 1998 (AT) .................................................. 405/98 U

(51) Int. Cl.$^7$ ...................................................... F02B 9/04
(52) U.S. Cl. ................ 123/276; 123/179.5; 123/DIG. 7; 123/625; 123/27 R
(58) Field of Search ........................... 123/276, 275, 123/262, 263, 625, 27 R, 179.5, DIG. 7

(56) References Cited

U.S. PATENT DOCUMENTS

| | | | | |
|---|---|---|---|---|
| 3,125,079 | * | 3/1964 | Hoffmann | 123/276 |
| 4,594,976 | * | 6/1986 | Gonzalez | 123/260 |
| 4,765,293 | * | 8/1988 | Gonzalez | 123/275 |
| 4,852,525 | * | 8/1989 | Ishida | 123/276 |
| 5,170,758 | * | 12/1992 | Chmela | 123/276 |
| 5,476,072 | * | 12/1995 | Evan Guy | 123/48 AA |
| 5,535,716 | * | 7/1996 | Sato et al. | 123/279 |
| 5,832,880 | * | 11/1998 | Dickey | 123/25 C |
| 6,105,550 | * | 8/2000 | Nieberding | 123/294 |

* cited by examiner

*Primary Examiner*—Andrew M. Dolinar
*Assistant Examiner*—Arnold Castro
(74) *Attorney, Agent, or Firm*—Dykema Gossett PLLC

(57) ABSTRACT

A process for operating of an internal combustion engine running on fuel that is both externally ignitible and self-ignitible, especially gasoline, the operating region of the engine including self-ignition or compression-ignition (CI) regions and external-ignition or spark-ignition (SI) regions, and a high compression ratio suitable for self-ignition of the fuel being provided, at least in compression-ignition regions, and combustion being initiated by self-ignition of the fuel-air mixture in compression-ignition regions and by spark-ignition of the fuel-air mixture in spark-ignition regions, and part-load operation being assigned to the compression-ignition region, whilst full-load operation and/or operating modes with high engine load as well as cold starts are assigned to the spark-ignition region. In order to improve the quality of the exhaust gases while maintaining high efficiency, a largely homogeneous fuel-air mixture should be produced in the combustion chamber in the compression-ignition region.

41 Claims, 2 Drawing Sheets

COMBUSTION ENGINE

BACKGROUND OF THE INVENTION

A process for operating of an internal combustion engine running on fuel that is both externally ignitible and self-ignitible, especially gasoline, the operating region of the engine including self-ignition or compression-ignition regions and external-ignition or sparkignition regions, and a high compression ratio suitable for self-ignition of the fuel being provided, at least in compression-ignition regions, and fuel combustion being initiated by self-ignition of the fuel-air mixture in compression-ignition regions and by spark-ignition of the fuel-air mixture in spark-ignition regions, and part-load operation being assigned to the compression-ignition region, whilst full-load operation and/or operating modes with high engine load as well as cold starts are assigned to the sparkignition region.

DESCRIPTION OF THE PRIOR ART

From the publication "Homogeneous Charge Compression Ignition (HCCI) of Diesel Fuel", Allen W. Gray et al., SAE 971676, it is known that combustion of a self-igniting lean fuel-air mixture will lead to extremely low $NO_x$ and particulate emissions due to the homogeneous concentration and temperature distribution. This method is referred to as HCCI process. It is further known that the use of diesel fuel for this type of combustion process will cause problems since the desired timing of initial ignition just before top dead center can only be effected with a low compression ratio and low effective mean pressure, on account of the diesel fuel's readiness to ignite. Compared to the conventional diesel process, the low compression ratio of about 10 required in this instance leads to considerable disadvantages with regard to specific fuel consumption and performance attained, which have so far prevented the use of this low-emission combustion process on a larger scale. Another problem specific to diesel fuel is its boiling range of about 170–360° C., which is not conducive to evaporation and thus homogenization of the cylinder charge and may lead to high levels of $No_x$, particulate and unburnt hydrocarbon emissions in addition to the danger of diesel fuel accumulating in lubricating oil.

The use of gasoline for the HCCI process has considerable advantages on account of its low tendency to self-ignition and its lower boiling range of 30–190° C. The compression ratio may be increased to about 15 to 17, similar to the diesel engine. However, the effective mean pressure obtainable in this case again is restricted to the part-load region, as discussed in the paper "An Experimental Study on Premixed-Charge Compression Ignition Gasoline Engine" by Taro Aoyama et al., SAE 960081.

In DE 36 32 579 C2 an air-compression, spark-ignition engine operating at a high compression ratio similar to that of a diesel engine is described, in which a stratified charge is produced to ensure ignition of the air-fuel mixture. The principle of charge stratification will ensure that at the time of arc-over the mixture prevailing in the vicinity of the ignition source will remain ignitible for a time long enough to produce a flame that is sufficiently large for the cylinder charge to continue burning. Such a Stratified Charge Spark Ignition (SCSI) process does not yield the low emission levels of the HCCI process at part-load, but it will tolerate much higher mean pressures and is characterized by lower particulate emissions than the diesel engine.

DE 28 51 504 A1 discloses a method as described above for operation of an internal combustion engine with variable compression ratio, wherein the engine runs on a single type of fuel that is both externally ignitible and self-ignitible. With this engine the compression ratio is increased under part-load conditions to permit self-ignition and decreased under full-load conditions to permit spark-ignition. Via an injection nozzle opening into the main combustion chamber or into a prechamber fuel is supplied for compression-ignition operation, and an inhomogeneous fuel-air mixture is produced in the combustion chamber. As a consequence no HCCI operation takes place. The fuel supply for spark-ignition operation is effected by means of a carburetor in one variant and via a further injection nozzle opening into a secondary combustion chamber in another variant. Fuel combustion is initiated in the SI mode by means of a spark plug reaching into the secondary combustion chamber. In the SI mode with fuel injection and air intake under full-load conditions there is a charge concentration in the secondary combustion chamber relative to the main combustion chamber. This process, which is well known in the art, ensures stable operation and high efficiency. The extremely low emissions encountered with HCCI will not be obtained in this instance, however.

Another internal combustion engine that is suitable for operation by both spark-ignition and compression-ignition, is described in U.S. Pat. No. 4,126,106 A. During start-up and part-load operation a stratified charge is produced with direct fuel injection into the combustion chamber, and fuel combustion is initiated by spark-ignition of this stratified charge. At full load, however, the fuel is directly injected onto the hot walls of the combustion chamber, where it evaporates and ignition is effected by compression according to the diesel principle. The engine is operated at a compression ratio of less than 16:1. At higher engine loads the time span between the beginning of injection and the moment of self-ignition will not suffice for satisfactory preparation of the mixture, which will adversely affect the combustion process and emission levels.

A multi-purpose engine is described in U.S. Pat. No. 3,125,079 A, which can be operated on both the compression-ignition and spark-ignition principle, at a fixed compression ratio of 15:1. The fuel is radially injected into the combustion chamber by direct injection from a multiple jet nozzle. This method is not suitable for obtaining a high degree of charge stratification.

SUMMARY OF THE INVENTION

It is an object of this invention to overcome the above disadvantages and to improve the quality of the exhaust gases while maintaining high efficiency in an internal combustion engine for fuel that is both externally ignitible and self-ignitible.

According to the invention this object is achieved by producing an at least approximately homogeneous fuel-air mixture in the combustion chamber in the compression-ignition mode. The process according to the invention thus has all advantages of the HCCI process whilst avoiding its disadvantages by changing over to spark-ignition under conditions of high engine load. A homogeneous fuel-air mixture can also be generated in the combustion chamber in at least one spark-ignition region. The homogeneous fuel-air mixture may be stoichiometric or lean. Particularly low fuel consumption and emission levels are obtained in spark-ignition regions by producing a stratified charge in the combustion chamber. The process of the invention thus combines the advantages of the HCCI process and the SCSI process.

At higher engine loads there would not be sufficient time in the HCCI process between the beginning of injection and the moment of self-ignition to give satisfactory mixture preparation; as a consequence, the combustion process and emission levels would deteriorate upon self-ignition. As spark-ignition is employed in the full-load region and/or operating regions with high engine load these disadvantages are avoided. Emissions may thus be significantly reduced in both part-load and full-load regions.

Although the SCSI process has higher emission levels than the HCCI process, it offers two advantages as regards emission vis-a-vis the direct injection (DI) process of a conventional diesel engine. First, gasoline has a significantly lower tendency towards particulate formation than diesel fuel on account of its smaller molecule size and the higher vapor pressure resulting therefrom, which will enhance mixture formation. Second, spark-ignition offers the additional degree of freedom over the diesel process that the time span between the initial injection and ignition of the fuel-air mixture may be considerably increased by proper selection of the interval between beginning of injection and moment of spark firing, i.e., the period available for preparation of the mixture may be significantly extended.

In operating regions with a homogeneous fuel-air mixture in the combustion chamber, this fuel-air mixture is advantageously homogenized by external mixture formation, preferably by injecting the fuel into an intake tube. Under conditions with stratified charge in the combustion chamber, on the other hand, the fuel is always injected directly into the combustion chamber.

Homogenization of the fuel-air mixture in the compression-ignition region can also be effected by direct fuel injection into the combustion chamber. For this purpose the fuel injector may have a variable injection characteristic. Such variable characteristic is obtained by means of variable lift injection nozzles or dual needle injection nozzles. Another way of obtaining a homogeneous fuel-air mixture is by varying the injection pressure of the directly injecting fuel injector. For this purpose the injection pressure should be variable between at least two pressure levels in dependence of engine operation, fuel injection in the part-load region taking place at a higher injection pressure than in the full-load region. For defined control of mixture formation via the quality of the fuel jet, use of an air-assisted fuel injector may be an advantage.

Switchover between compression-ignition and spark-ignition depends on the effective mean pressure of the working process and takes place at a predefined limit of effective mean pressure. The compression-ignition region is below this limit and the spark-ignition region is above this limit. The limit is defined in a region of the effective mean pressure in which the indicated mean pressure is between 4 and 9 bar, and preferably about 6 to 9 bar, and most preferably 7 to 8.5 bar, the pressure build-up rate of the cylinder pressure p preferably being less or equal 5 bar per degree crank angle $\phi$.

For implementation of the process an internal combustion engine with a combustion chamber in the piston of each cylinder is suited, into which opens at least one fuel injector for direct fuel injection and one ignition device which can be activated and deactivated depending on the operating state of the engine. The engine is further provided with a device for external mixture formation preferably constituted by an intake tube injector for producing a homogeneous fuel-air mixture in the combustion chamber during compression-ignition operation, and has a compression ratio of 15:1 to 20:1, i.e., preferably 17:1 to 18:1, and a control unit for switchover between compression-ignition and spark-ignition mode, which will register the actual operating parameters for each operating mode of the engine. The combustion chamber of each cylinder is formed by a piston recess, at least for the largest part. Each cylinder is further provided with at least one intake port which is designed so as to create a swirl. By control of the fuel injection and/or the intake flow either a homogeneous or a stratified fuel-air mixture will be obtained, as is desirable. The internal combustion engine must thus include all devices that are necessary for operation in the HCCI mode at part load and in the SCSI mode at high load.

To obtain satisfactory atomization of the fuel jet during part-load operation, the nozzle of the fuel injector is preferably configured as a single-jet or dual-jet nozzle with good atomization properties (air-assisted, if desired). In the instance of direct injection, the direction of the injection jet of the fuel injector is preferably optimized for the SCSI process, i.e., the point of impingement of the fuel jet in top dead center of the piston is located on the periphery of a rotationally symmetric piston recess which is restricted at its rim.

The intake port or ports situated in the cylinder head should have a relatively high inlet swirl value, i.e., greater than 2. An ignition device constituted by a high-voltage spark igniter is recommended for reliable ignition of the fuel.

Another advantage for spark-ignition in the full-load region is obtained by positioning the ignition device and/or the fuel injector at the periphery of the combustion chamber, the piercing points of the axes of the ignition device and the injector through the bottom plane of the cylinder head, as seen from the cylinder axis, preferably forming a central angle about the cylinder axis of about 90° to 200°, and preferably, about 120°, the ignition device being placed downstream by this angle in the direction of the swirl.

It is proposed in a preferable variant of the invention that at least one ignition detector be introduced into the combustion chamber, and that fuel injection and the quantity-temperature control of an exhaust gas recirculation system be effected, at least during part-load operation, in dependence of the ignition moment of the fuel-air mixture. In this way it will be possible to set the optimum moment of injection for HCCI operation. In a cooled exhaust gas recirculation system with temperature control the temperature of the recirculated exhaust gas is set at a higher level for part-load operation than at full load.

Since it may be desirable to have a higher compression ratio in the part-load mode than at full load, a device may be provided for variation of the actual compression ratio, which device is preferably constituted by a variable valve timing unit for varying the closing time of at least one intake valve. To permit control of the amount of residual gas in order to increase the temperature of the charge at part load if internal exhaust gas recirculation is to be used, it may further be provided that the variable valve timing unit permit the timing of at least one exhaust valve depending on engine operating parameters.

In another variant of the invention, which is characterized by great simplicity, the proposal is put forward that a fixed compression ratio be used. This fixed ratio is best obtained by optimization efforts to meet both compression-ignition and spark-ignition requirements.

It is particularly useful to provide the internal combustion engine with an exhaust gas recirculation system for internal and/or external exhaust gas recirculation. When the engine is operating in a compression-ignition mode the exhaust gas recirculation system can be used for timing the ignition lag or initial combustion. During spark-ignition operation, however, the exhaust gas recirculation system serves its usual purpose of reducing Nox emissions by lowering the combustion temperature.

BRIEF DESCRIPTION OF THE DRAWINGS

The invention will now be further described with reference to the accompanying drawings, in which

In FIG. 2 other characteristic elements of the invention which are located in the cylinder head are represented by broken lines.

DETAILED DESCRIPTION OF THE PREFERRED EMBODIMENT

Figure 1:
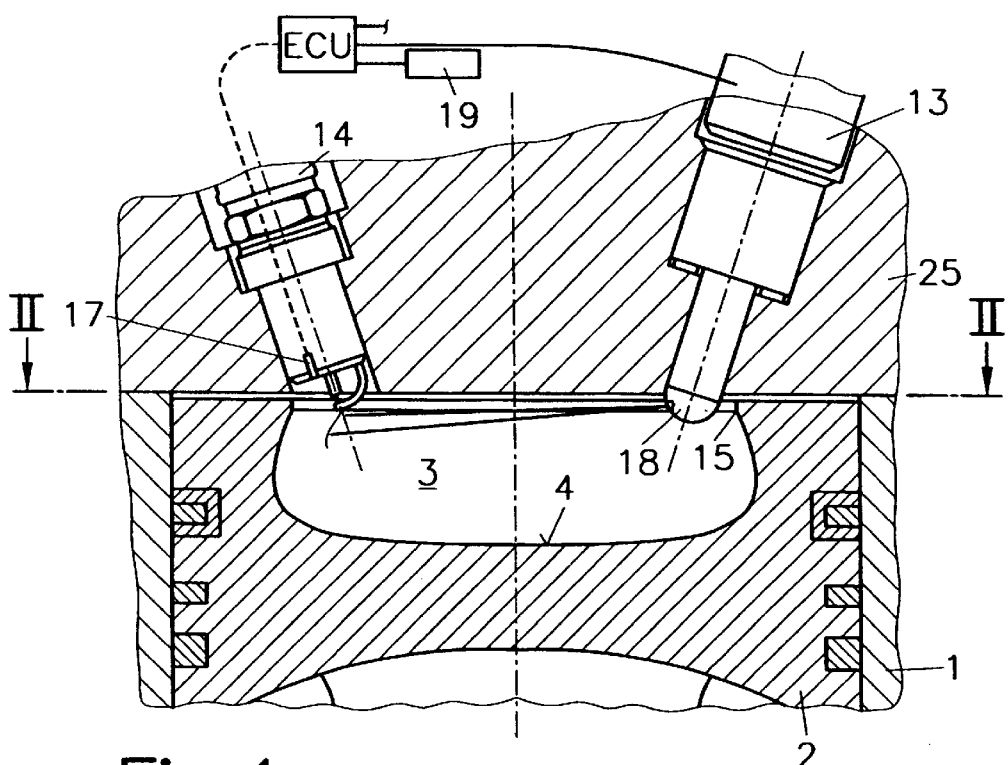
FIG. 1 is a longitudinal section through an internal combustion engine in accordance with the invention, along line I—I in FIG. 2.
Figure 2:
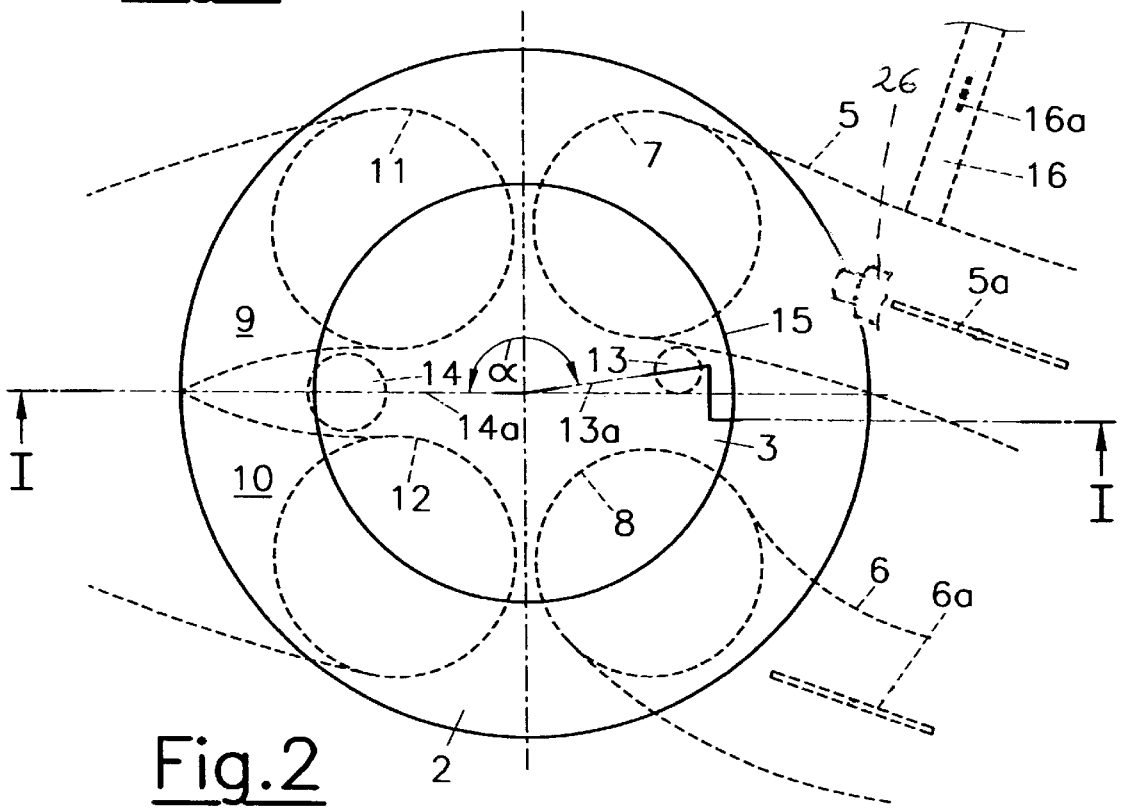
FIG. 2 is a view from above of a cylinder along line II—II in FIG. 1.

FIG. 1 shows a cylinder 1 with a reciprocating piston 2 in top dead center. The piston 2 has a piston recess 4 forming a combustion chamber 3. In the cylinder head 25 intake ports 5, 6 are positioned, at least one of which intake ports, i.e., 6 is configured so as to create a swirl, as indicated by broken lines in FIG. 2. Each of intake ports 5, 6 leads to an intake valve 7, 8. The cylinder head 25 also includes exhaust ports 9, 10, which open into the combustion chamber 3 via exhaust valves 11, 12.

The cylinder head 25 is provided with a fuel injector 13 for direct fuel injection into the combustion chamber 3 and with a high voltage spark plug 14 for ignition, both fuel injector 13 and spark plug 14 being positioned at the periphery 15 of the rotationally symmetric piston recess 4 which is restricted at its rim.

The nozzle 18 of the injector 13 is configured as a single-jet or dual-jet nozzle with good atomization properties and an air supply for air-assisted operation, which is not shown here in detail. The injector 13 is connected to an injection system (also not shown in this drawing), by means of which at least two different pressure levels are obtainable.

The piercing points of axis 14a of the spark plug 14 and axis 13a of the fuel injector 13 through the bottom plane of the cylinder head form a central angle α of about 90° to 200°, and preferably 120°, as seen in plan view. The spark plug 14 is placed downstream by this angle in the direction of the swirl.

At least one of intake ports 5, 6 is connected with an exhaust gas recirculation system 16 and an exhaust gas control element 16a by means of which exhaust gas can be introduced into the intake flow.

The moment of ignition is detected by means of a suitable sensor 17 which may be integrated into the spark plug 14, for instance. The sensor 17 is connected to an electronic control unit ECU, which will time the moment of injection of the fuel injector 13 in dependence of the moment of ignition, and control the temperature and amount of recirculated exhaust gas of the exhaust gas recirculation system 16.

At least one of the two intake ports 5, 6 is provided with an inlet control element 5a or 6a for variation of the swirl in combustion chamber 3.

The internal combustion engine is further provided with a variable valve timing unit 19 for intake valves 7, 8 and exhaust valves 11, 12, by means of which the closing time of at least one intake valve 7, 8 and the opening and/or closing time of at least one exhaust valve 11, 12 can be varied. The variable valve timing unit 19 can be constituted by a known electric, hydraulic, pneumatic or mechanical valve timing device for variation of control time. Valve timing is also effected with the electronic control unit ECU.

In the cold-start phase the internal combustion engine operates on a spark-ignition cycle using a homogeneous fuel mixture. When the engine has reached operating temperature, the compression ratio at part-load is raised to a level of 14:1 to about 18:1 which is required for self-ignition of the gasoline. In this operating mode the fuel is delivered to the injector 13 at a relatively high pressure. The nozzle 18 of the injector 13 will ensure good atomization of the fuel jet. Exhaust gas is recirculated via the exhaust gas recirculation system 16 at a relatively high temperature, which will ensure that the self-ignition temperature of the fuel just before top dead center is reached very quickly. The moment of injection of the fuel injector 13 is timed by means of the ECU unit in dependence of the moment of ignition obtained from the ignition sensor 17. Particularly good homogenization of the fuel-air mixture in the compression-ignition mode CI is also obtained with the use of an external mixture formation unit known in the art, such as an intake tube injector 26 (indicated by broken lines in FIG. 2) or a carburetor. In this way the mixture is prepared and homogenized while still being outside of the combustion chamber 3. The beginning of opening of intake valves 7, 8 is timed such that a relatively high compression ratio can be obtained. A rise in charge temperature is obtained by varying the control times of exhaust valves 11, 12 in order to achieve internal exhaust gas recirculation.

An increase in load will lead to an early moment of ignition, which may have an adverse effect on the combustion process and thus specific fuel consumption and performance attained. For this reason the HCCI principle will be abandoned in the higher load region of the engine in favour of SCSI, similar to the cold-start phase. The ignition device 14 is activated once more by the electronic control unit ECU, and the fuel injector 13 is supplied with fuel from the injection system (not shown here in detail) at relatively low pressure, and cooled exhaust gas is introduced into the intake flow, and the compression ratio is reduced by adjusting the valve timing. During injection in the spark-ignition mode SI fuel is deposited on the wall of the combustion chamber 3. By evaporation of the fuel on the wall of the combustion chamber 3 a mixture will form in the vicinity of the wall, leading to a stratified charge in the combustion chamber 3. As no homogenization of the fuel-air mixture is required in the spark-ignition mode SI, the moment of injection may be set relatively late compared to the injection moment in the compression-ignition mode CI.

Figure 3:
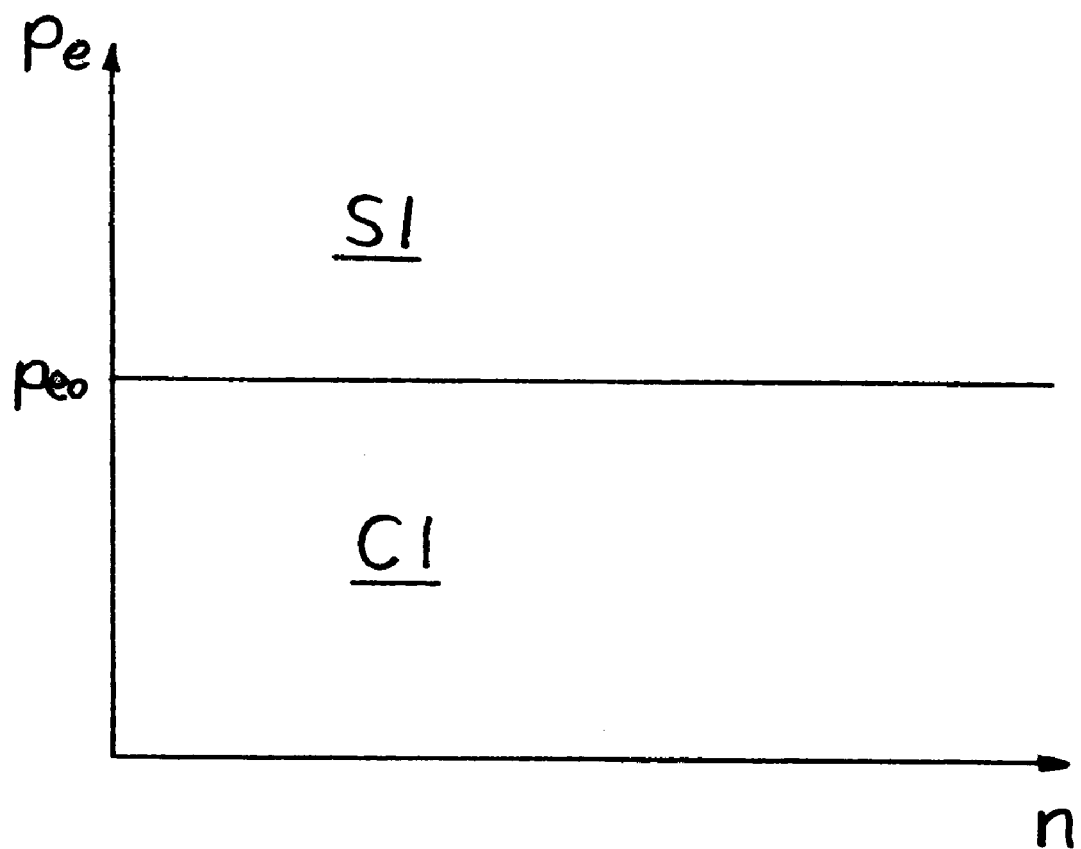
FIG. 3 is a graph of mean effective pressure against rpm.

Switchover between compression-ignition and spark-ignition preferably takes place in dependence of the effective mean pressure $p_e$, as is shown in FIG. 3, where effective mean pressure $p_e$ is plotted against engine speed n. The compression-ignition region CI is below a predefined limit $p_{e0}$ of effective mean pressure $p_e$, at which the indicated mean pressure is 4 to 9 bar, and preferably 6 to 9 bar, and more preferably 7 to 8.5 bar, whilst the spark-ignition region SI is above the limit $p_{e0}$. The pressure build-up rate $dp/d\phi$ of the cylinder pressure p above the crank angle $\phi$ is less or equal 5 bar per degree crank angle $\phi$ for reasons of noise. The engine management system uses the computed injection volume as a control variable.

By means of internal exhaust gas recirculation (exhaust retention) or external exhaust gas recirculation the ignition lag or moment of combustion can be timed in the CI mode. Relatively high percentages of exhaust gas in the cylinder charge of up to more than 50% are used for this purpose. In the SI mode exhaust gas recirculation is employed to reduce nitrous oxide emissions in a manner known in the art.

With the internal combustion engine and process described in this publication only one kind of fuel is used, i.e., either gasoline, or a gas, or an alcohol, or a mixture of these components.

What is claimed is:

1. An internal combustion engine which is operable in a combustion-engine mode at part load and in a spark-ignition mode at full load and high engine load and in the cold-start phase, with a combustion chamber for each cylinder, into which opens at least one fuel injector for direct fuel injection and one ignition device which is activatable and deactivable depending on the operating mode of the engine, wherein a substantially homogeneous fuel-air mixture produced in the combustion chamber during compression-ignition operation, and wherein the actual compression ratio is 15:1 to 20:1, and wherein a control unit is provided for switchover between compression-ignition and spark-ignition mode, which will register the actual operating parameters for each operating mode of the engine, the combustion chamber being formed by a piston recess, at least for the largest part, and each cylinder is provided with at least one intake port which is designed so as to create a swirl.

2. An internal combustion engine according to claim 1, wherein the actual compression ratio is 17:1 to 18:1.

3. An internal combustion engine according to claim 1, wherein by control of fuel injection either a homogeneous fuel-air mixture will be obtained with compression-ignition or a stratified fuel-air mixture with spark-ignition.

4. An internal combustion engine according to claim 1, wherein by control of intake flow either a homogeneous fuel-air mixture will be obtained with compression-ignition or a stratified fuel-air mixture with spark-ignition.

5. An internal combustion engine according to claim 1, wherein a fixed actual compression ratio is used.

6. An internal combustion engine according to claim 1, wherein an air-assisted fuel injector is used.

7. An internal combustion engine according to claim 1, wherein the injection pressure is variable between at least two pressure levels depending on engine operation, fuel injection in the part-load region taking place at a higher injection pressure than in the full-load region.

8. An internal combustion engine according to claim 1, including an exhaust gas recirculation system for internal exhaust gas recirculation.

9. An internal combustion engine according to claim 1, including an exhaust gas recirculation system for external exhaust gas recirculation.

10. An internal combustion engine according to claim 1, wherein the homogeneous fuel-air mixture is produced by means of a device for external mixture formation.

11. An internal combustion engine according to claim 10, wherein the device for external mixture formation is constituted by an intake tube injector.

12. An internal combustion engine according to claim 1, wherein the ignition device and the fuel injector are positioned at a combustion chamber periphery.

13. An internal combustion engine according to claim 12, wherein the piercing points of the axes of the ignition device and the fuel injector through a bottom plane of a cylinder head form a central angle about the cylinder axis of about 90° to 200°, as seen from the cylinder axis, and the ignition device is placed downstream by this angle in the direction of the swirl.

14. An internal combustion engine according to claim 12, wherein the piercing points of the axes of the ignition device and the fuel injector through a bottom plane of a cylinder head form a central angle about the cylinder axis of about 90° to 120°, as seen from the cylinder axis, and the ignition device is placed downstream by this angle in the direction of the swirl.

15. An internal combustion engine according to claim 1, wherein at least one ignition detector is introduced into the combustion chamber, and fuel injection, at least during part-load operation, is effected depending on the ignition moment of the fuel-air mixture.

16. An internal combustion engine according to claim 15, wherein quantity control of an exhaust gas recirculation system is effected depending on the ignition moment of the fuel-air mixture.

17. An internal combustion engine according to claim 15, wherein temperature control of an exhaust gas recirculation system is effected depending on the ignition moment of the fuel-air mixture.

18. An internal combustion engine according to claim 1, wherein a device for variation of the actual compression ratio is provided.

19. An internal combustion engine according to claim 18, wherein the device for variation of the actual compression ratio is constituted by a variable valve timing unit.

20. An internal combustion engine according to claim 19, wherein the variable valve timing unit is constituted for varying the closing time of at least one intake valve.

21. An internal combustion engine according to claim 19, wherein the variable valve timing unit permits the timing of at least one exhaust valve depending on engine operating parameters.

22. An internal combustion engine according to claim 1, wherein the homogeneous fuel-air mixture is produced by means of a device for internal mixture formation.

23. An internal combustion engine according to claim 22, wherein the device for internal mixture formation is constituted by the fuel injector for direct fuel injection.

24. A internal combustion engine according to claim 23, wherein a nozzle of the fuel injector is configured as a single-jet nozzle.

25. An internal combustion engine according to claim 23, wherein a nozzle of the fuel injector is configured as a dual-jet nozzle.

26. An internal combustion engine according to claim 23, wherein the fuel injector has a variable injection characteristic.

27. An internal combustion engine according to claim 26, wherein the fuel injector is constituted by a dual needle injection nozzle.

28. An internal combustion engine according to claim 26, wherein the fuel injector is constituted by a variable lift injection nozzle.

29. A process for operation of an internal combustion engine running on fuel that is both externally ignitable and self-ignitable, especially gasoline, an operating region of the engine including-self-ignition or compression-ignition regions and external-ignition or spark-ignition of the fuel being provided, at least in compression-ignition regions, and fuel combustion being initiated by self-ignition of an fuel-air mixture in compression-ignition regions and by spark-ignition of the fuel-air mixture in spark-ignition regions, and part-load operation being assigned to the compression-ignition region, whilst full-load operation and operating modes with high engine load as well as cold starts are assigned to the spark-ignition region, wherein an at least substantially homogeneous fuel-air mixture is produced in a combustion chamber in the compression-ignition region.

30. A process according to claim 29, wherein a stratified charge is produced in the combustion chamber in at least one spark-ignition region.

31. A process according to claim 29, wherein a homogeneous fuel-air mixture is produced in the combustion chamber in at least one spark-ignition region.

32. A process according to claim 29, wherein in operating regions with stratified charge in the combustion chamber, the fuel is injected directly into the combustion chamber.

33. A process according to claim 29, wherein in operating regions with a homogeneous fuel-air mixture in the combustion chamber, the fuel-air mixture is homogenized by external mixture formation.

34. A process according to claim 33, wherein the fuel-air mixture is homogenized by injection of the fuel into an intake tube.

35. A process according to claim 29, wherein in operation regions with a homogeneous fuel-air mixture in the combustion chamber, the fuel-air mixture is homogenized by internal mixture formation.

36. A process according to claim 35, wherein in operating regions with a homogeneous fuel-air mixture, injection takes place at a higher pressure than in operating regions with stratified charge.

37. A process according to claim 29, wherein the switchover between compression-ignition and spark-ignition is effected at a predefined limit of indicated effective mean pressure, and wherein the compression-ignition region is below this limit and the spark-ignition region is above this limit.

38. A process according to claim 37, wherein the limit is defined in a region of the effective mean pressure in which the indicated mean pressure is between 4 and 9 bar.

39. A process according to claim 37, wherein the limit is defined in a region of the effective mean pressure in which the indicated mean pressure is between 6 and 9 bar.

40. A process according to claim 37, wherein the limit is defined in a region of the effective mean pressure in which the indicated mean pressure is between 7 and 8.5 bar.

41. A process according to claim 37, wherein the pressure build-up rate of the cylinder pressure is at most 5 bar per degree crank angle.

* * * * *